(12) United States Patent
Keen et al.

(10) Patent No.: US 9,936,687 B1
(45) Date of Patent: Apr. 10, 2018

(54) DEER SCENT STAKE

(71) Applicants: Cecil Melvin Keen, Clewiston, FL (US); Kenneth Wayne Forrester, Lowndesboro, AL (US)

(72) Inventors: Cecil Melvin Keen, Clewiston, FL (US); Kenneth Wayne Forrester, Lowndesboro, AL (US)

( * ) Notice: Subject to any disclaimer, the term of this patent is extended or adjusted under 35 U.S.C. 154(b) by 0 days.

(21) Appl. No.: 15/429,675

(22) Filed: Feb. 10, 2017

(51) Int. Cl.
| | | |
|---|---|---|
| *A01M 31/00* | (2006.01) | |
| *A61L 9/12* | (2006.01) | |
| *A61L 9/04* | (2006.01) | |
| *G01C 15/04* | (2006.01) | |
| *A01M 31/06* | (2006.01) | |
| *E04H 12/22* | (2006.01) | |
| *F16M 13/00* | (2006.01) | |

(52) U.S. Cl.
CPC .......... *A01M 31/008* (2013.01); *A01M 31/06* (2013.01); *E04H 12/2215* (2013.01); *F16M 13/005* (2013.01); *G01C 15/04* (2013.01)

(58) Field of Classification Search
CPC . A01M 31/008; A01M 31/06; E04H 12/2215; G01C 15/04; A61L 9/04; A61L 9/12; A61L 9/127; B05B 15/062
See application file for complete search history.

(56) References Cited

U.S. PATENT DOCUMENTS

| | | | | |
|---|---|---|---|---|
| 3,579,908 | A * | 5/1971 | Morgan | A01G 17/06 239/208 |
| 4,969,599 | A * | 11/1990 | Campbell | A01M 31/008 239/47 |
| 5,947,379 | A | 9/1999 | Freeman | |
| 6,165,570 | A | 12/2000 | Shannon | |
| 7,380,370 | B2 * | 6/2008 | Livingston | A01M 29/12 239/47 |
| 8,490,889 | B2 | 7/2013 | Rydbom | |
| 8,938,905 | B1 | 1/2015 | Moore | |
| 9,060,506 | B2 | 6/2015 | Broderick | |
| 2007/0095941 | A1 | 5/2007 | Gorres | |
| 2013/0340315 | A1 | 12/2013 | Gustafson | |
| 2015/0082681 | A1 | 3/2015 | Moore | |
| 2015/0362286 | A1 | 12/2015 | Sandknop | |
| 2016/0198722 | A1 * | 7/2016 | Fisher | A01M 31/00 43/1 |

* cited by examiner

*Primary Examiner* — Darren W Gorman
(74) *Attorney, Agent, or Firm* — Brian S. Steinberger; Law Offices of Brian S. Steinberger, P.A.

(57) ABSTRACT

Devices, apparatus, systems, and methods for providing deer scent stakes with removable caps to access reusable cylinders that can hold scented balls that can replenished with deer scents. The stakes can be placed at pre-determined distances in order to be used as yardage type markers for hunters to estimate the shooting distance to the deer target that approaches the stake(s).

16 Claims, 8 Drawing Sheets

FIG. 1
FIG. 2
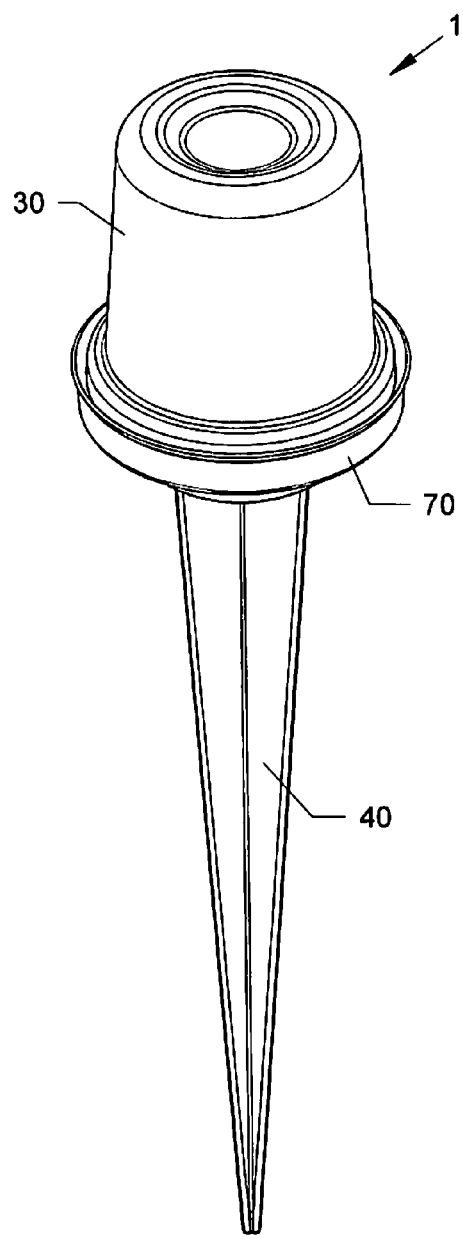
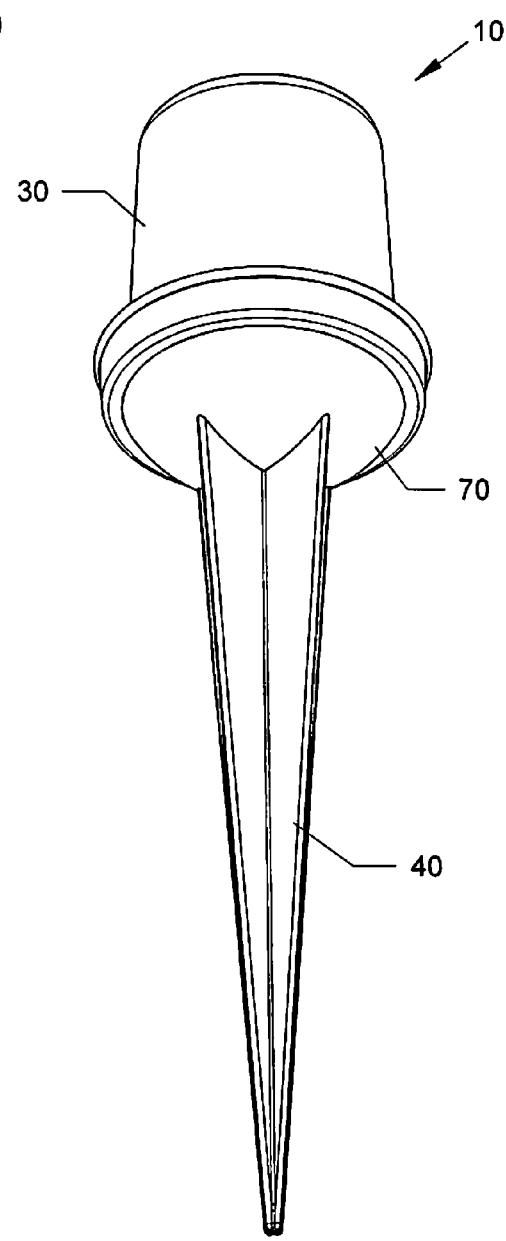

FIG. 5
FIG. 6
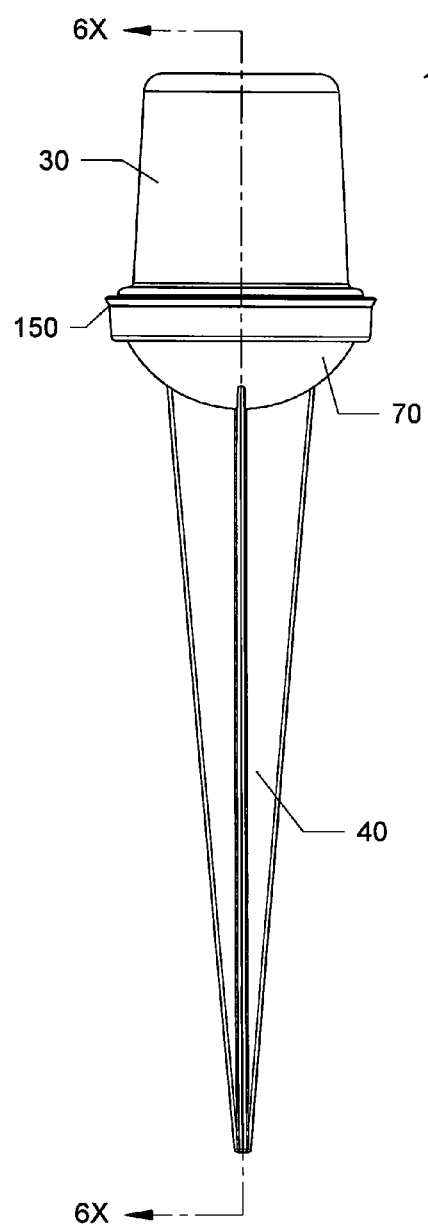
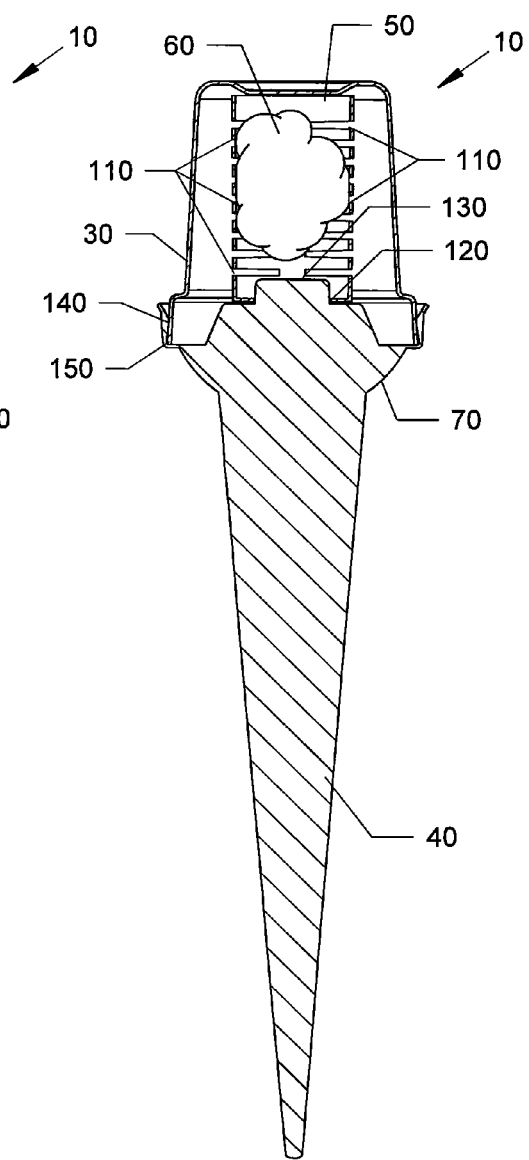

DEER SCENT STAKE

FIELD OF INVENTION

This invention relates to attracting animals, such as deer, and in particular to devices, apparatus, systems, and methods for providing stakes with removable caps to access reusable cylinders that can hold scented balls that can be replenished with deer scents, where the stakes can be placed at pre-determined distances in order to be used as yardage type markers for hunters to estimate the shooting distance to the deer target that approaches the stake(s).

BACKGROUND AND PRIOR ART

It is extremely popular for hunters to position liquid scents at different locations to attract game such as deer. Various types of liquid scents can include deer urine, food, combinations thereof, and the like. Popular types of liquid scent dispensers have included hanging dripping bags to trees, or laying dripping bags on the ground, where the liquid dispensers are located adjacent to the hunter. However, there are problems associated with liquid scent dispensers.

Dispensing the liquid scent on the ground can have a limited life since the liquid scent can easily dry and or soak into the ground and no longer work. Additionally, many liquid scent dispensers have a one-time life, and cannot be reused, causing the hunter to have to continuously purchase new dispensers over time.

Another major problem is that the approaching deer can also smell the hunter which causes the game to avoid the area where the hunter is located. Also, requiring the dispensers to hang from trees limits the locations of the hanging dispensers to be only located where trees are located which limits the placement of the dispenser.

Thus, the need exists for solutions to the above problems with the prior art.

SUMMARY OF THE INVENTION

A primary objective of the present invention is to provide devices, apparatus, systems, and methods for using deer scent stakes with removable caps to access reusable cylinders that can hold scented balls that can be replenished with deer scents, where the stakes can be placed at pre-determined distances in order to be used as yardage markers for hunters to estimate the shooting distance to the deer target that approaches the stake(s).

A deer scent device can include a compartment having a removable cover, a scent holder inside of the compartment the scent holder for supporting a deer scent liquid inside, and a ground engaging stake extending beneath the compartment for allowing the device to be mounted in the ground The compartment with the removable cover can include a base having an upwardly protruding perimeter edge, and a cylindrical cap as the cover, the cylindrical cap having a closed top and closed sides, and lower extending edge, the lower extending edge of the cover being attachable and detachable about the upwardly protruding perimeter edge of the base.

The scent holder can include a removable cylindrical holder having a plurality of parallel vent openings therethrough, and an absorbing material being removable from the cylindrical holder, the absorbing material capable of soaking up a liquid deer scent.

The absorbing material can include a ball of cotton. The absorbing material can include a sponge material.

The deer scent device can further include an attachment mechanism for attaching the cylindrical holder to a base in the compartment, the attachment mechanism including a cross pattern of raised ribs that mateably slides into a cross pattern of slots.

The deer scent device can further include a marker on a side of the device for indicating a yardage distance target that is adapted to be visible to hunter using the device. The marker can be a color marking on the side of the device adapted to be visible to the hunter. The marker can be a number marking on the side of the device adapted to be visible to the hunter.

A deer scent dispenser and target aiming system, can include a first compartment having a first removable cover, a first scent holder inside of the first compartment the first scent holder for supporting a deer scent liquid inside, a ground engaging stake extending beneath the first compartment for allowing the compartment to be mounted in the ground, and a distance indicator marker on a side of the first compartment for indicating a yardage distance target that is adapted to be visible to hunter using the device.

The deer scent dispenser and target aiming system can further include a second compartment having a second removable cover, a second scent holder inside of the second compartment the second scent holder for supporting a deer scent liquid inside, a second ground engaging stake extending beneath the second compartment for allowing the second compartment to be mounted in the ground, and a second distance indicator marker on a side of the second compartment for indicating a yardage distance target that is adapted to be visible to hunter using the device.

The first compartment with the first removable cover, and the second compartment with the second removable cover can each include a base having an upwardly protruding perimeter edge, and a cylindrical cap as the cover, the cylindrical cap having a closed top and closed sides, and lower extending edge, the lower extending edge of the cover being attachable and detachable about the upwardly protruding perimeter edge of the base.

The first scent holder and the second holder can each include a removable cylindrical holder having a plurality of parallel vent openings therethrough, and an absorbing material being removable from the cylindrical holder, the absorbing material capable of soaking up a liquid deer scent.

The absorbing material can include a ball of cotton. The absorbing material can include a sponge material.

The first marker and the second marker can each include a color marking on the side of the device adapted to be visible to the hunter.

The first marker and the second marker each can each include a number marking on the side of the device adapted to be visible to the hunter.

The first scent holder and the second scent holder can each include an attachment mechanism for attaching each cylindrical holder to a base in each compartment, the attachment mechanism including a cross pattern of raised ribs that mateably slides into a cross pattern of slots.

Further objects and advantages of this invention will be apparent from the following detailed description of the presently preferred embodiments which are illustrated schematically in the accompanying drawings.

BRIEF DESCRIPTION OF THE FIGURES

FIG. 1 is a top perspective view of the scent holder and yardage marker assembly.

FIG. 2 is a bottom perspective view of the scent holder and yardage marker assembly of FIG. 1.

FIG. 5 is a front view of the scent holder and yardage marker assembly of FIG. 1.

FIG. 6 is a side cross-sectional view of the scent holder and yardage marker assembly of FIG. 5.

DESCRIPTION OF THE PREFERRED EMBODIMENTS

Figure 3:
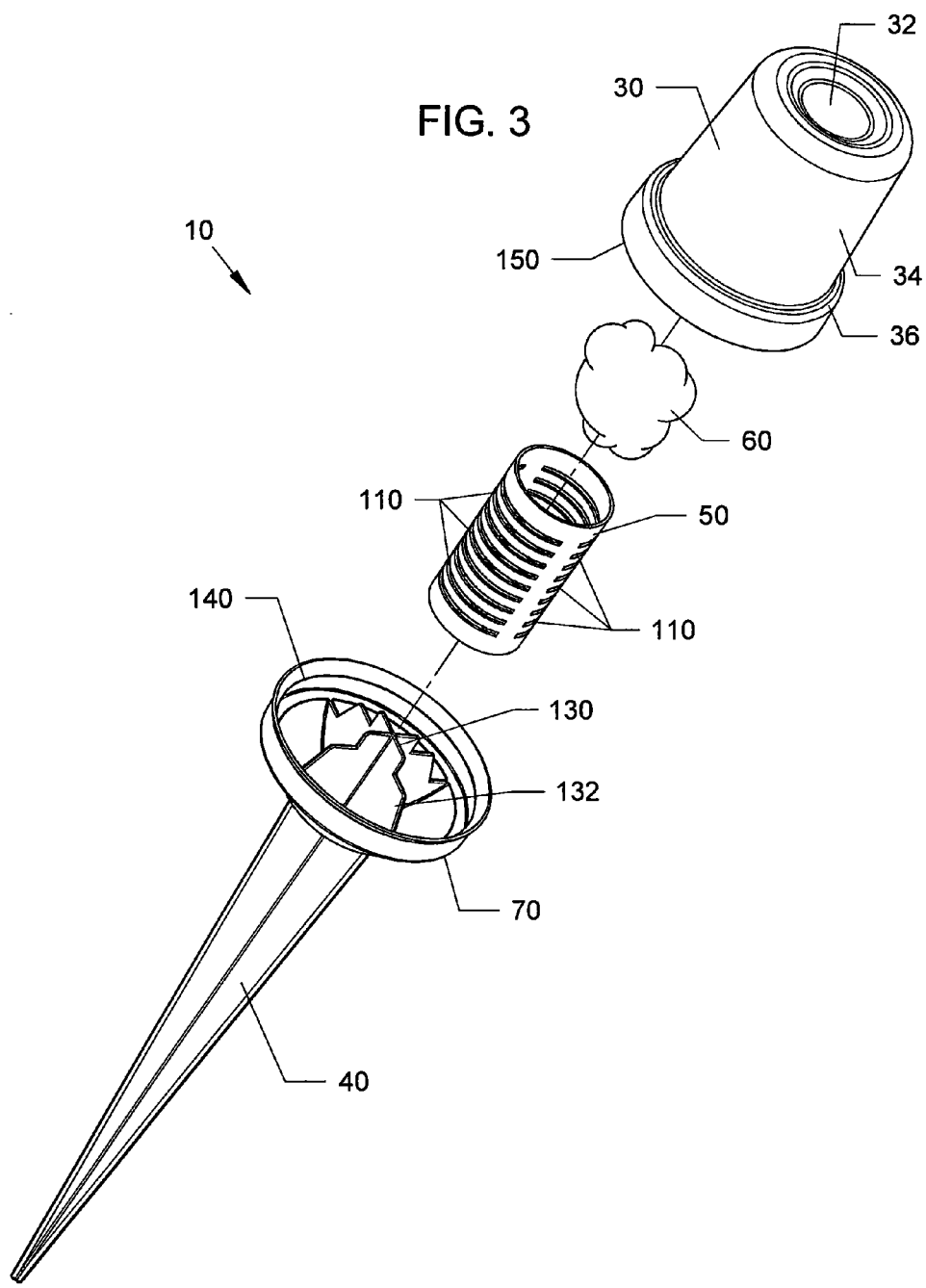
FIG. 3 is an exploded top perspective view of the scent holder and yardage marker assembly of FIG. 1.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Scent Holder and Yardage Marker assembly.
20 Turf.
30 Cup cover in concert with the scent cup helps to contain the scent while in transport.
32 closed top
34 outwardly tapering sides
36 ring shaped outwardly extending lip
40 Turf spike.
50 Scent ball holder.
60 Cotton scent ball holds liquid deer attractant.
70 Scent cup base in concert with the cup cover contains the scent while in transport.
80 Hunter.
90 Trees, shrubs or other cover.
100 Deer or other game animal targeted by liquid scent attractant.
110 Scent holder vents.
120 Scent holder mount cross shape slots.
130 Scent cup mounting ribs form a cross shape that fits into the mount slots in the scent holder to secure the holder to the scent cup.
132 lower stepped out set of raised ribs
140 Snap recess edge feature on scent cup allows the cover to fit securely and contain the deer attractant scent while in transport.
150 Downwardly protruding snap feature on cover mates to scent cover snap feature FIG. 1 is a top perspective view of the scent holder and yardage marker assembly 10. FIG. 2 is a bottom perspective view of the scent holder and yardage marker assembly 10 of FIG. 1.

Figure 4:
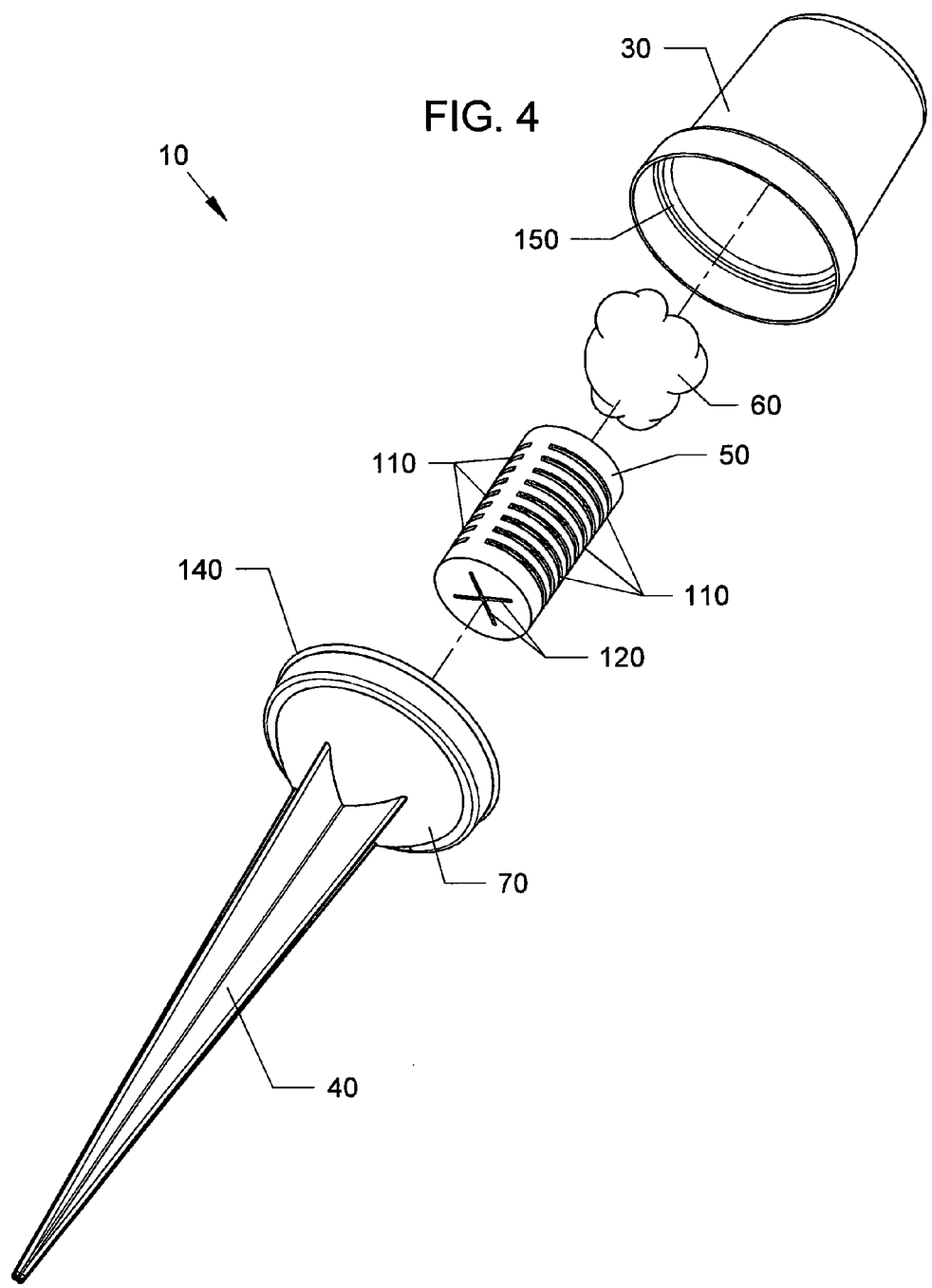
FIG. 4 is an exploded bottom perspective view of the scent holder and yardage marker assembly of FIG. 1.

FIG. 3 is an exploded top perspective view of the scent holder and yardage marker assembly 10 of FIG. 1. FIG. 4 is an exploded bottom perspective view of the scent holder and yardage marker assembly of FIG. 1.

FIG. 5 is a front view of the scent holder and yardage marker assembly 10 of FIG. 1. FIG. 6 is a side cross-sectional view of the scent holder and yardage marker assembly 10 of FIG. 5.

Figure 7:
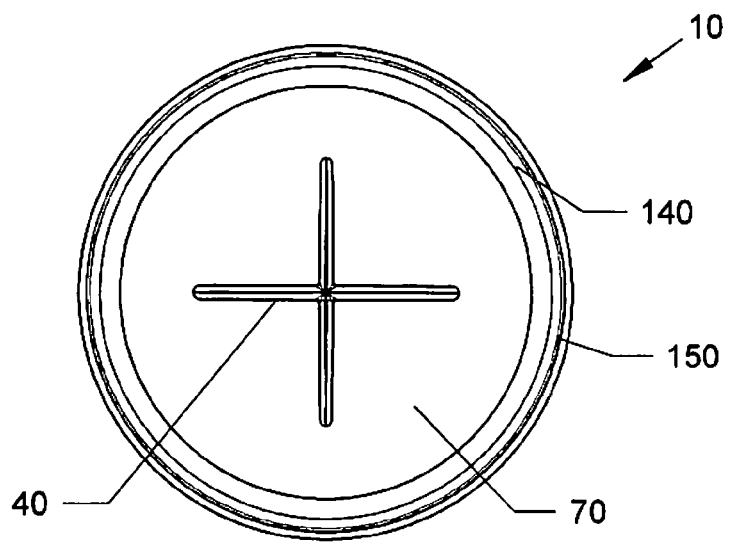
FIG. 7 is a bottom view of the scent holder and yardage marker assembly of FIG. 5.
Figure 8:
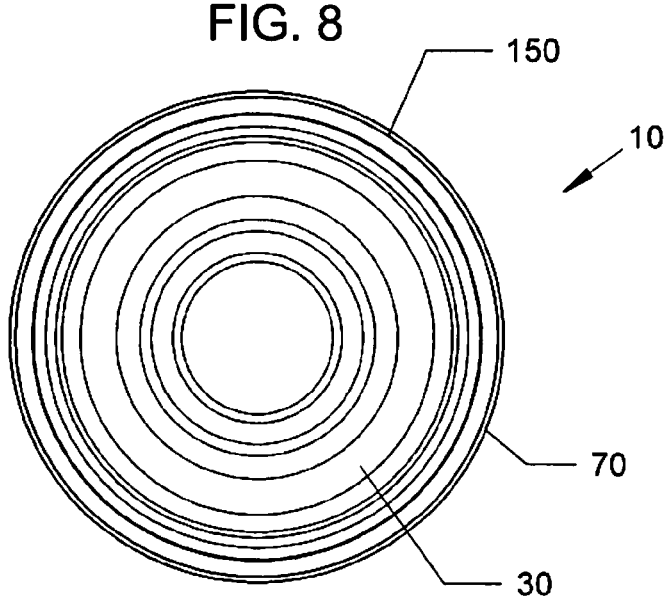
FIG. 8 is a top view of the scent holder and yardage marker assembly of FIG. 5.

FIG. 7 is a bottom view of the scent holder and yardage marker assembly 10 of FIG. 5. FIG. 8 is a top view of the scent holder and yardage marker assembly 10 of FIG. 5.

Referring to FIGS. 1-8, the scent holder and yardage marker assembly 10 can include a cup cover 30 having a generally cylindrical shape with a closed top 32 and outwardly tapering sides 34 to a ring shaped lower extending lip 36, with a downwardly protruding edge 150, which can snapably fit into a snap recess edge 140 on a cup base 70.

Cover 30 can be attached to cup base 70 by pushing the downwardly protruding edge 150 to snap into the recess edge 140 in the cup base 30, so that the cover 30 is attached to the cup base 30 while the assembly 10 is being transported.

Extending beneath a convex curved portion of the cup base 70 can be a downwardly extending spike 40, that can have a wide upper end which tapers down to a narrow tip end for being insertable into a ground surface.

Inside of the cup base 70 can be a cross shaped pattern of upper raised mounting ribs 130 which step out to a lower set of raised ribs 132. The upper raised mounting ribs 130 can fit and mateably insert into the cross shaped mount slots 120 in the bottom of the scent holder 50 in order to secure the scent holder 50 to the scent cup 70. The lower stepped out ribs 132 can function as a stop to limit the mounting of the scent holder 50 to the upper ribs 130.

Referring to FIGS. 1-8, the scent holder 50 can have a cylindrical shape with an open top end and cylindrical sides having columns of parallel vents 110.

An absorbing material 60 such as a cotton ball can be soaked with a deer scent, such as but not limited to deer urine, food, combinations thereof, and the like. The absorbing material 60 can alternatively include a sponge material, such as but not limited to open cell foam, and the like. The hunter can soak the absorbing material 60 with the liquid deer scent and place it into the open top of the scent holder 50, and attach the scent holder 50 to the cup base 70 by sliding the mounting slots 120 over the raised ribs 130.

Figure 9:
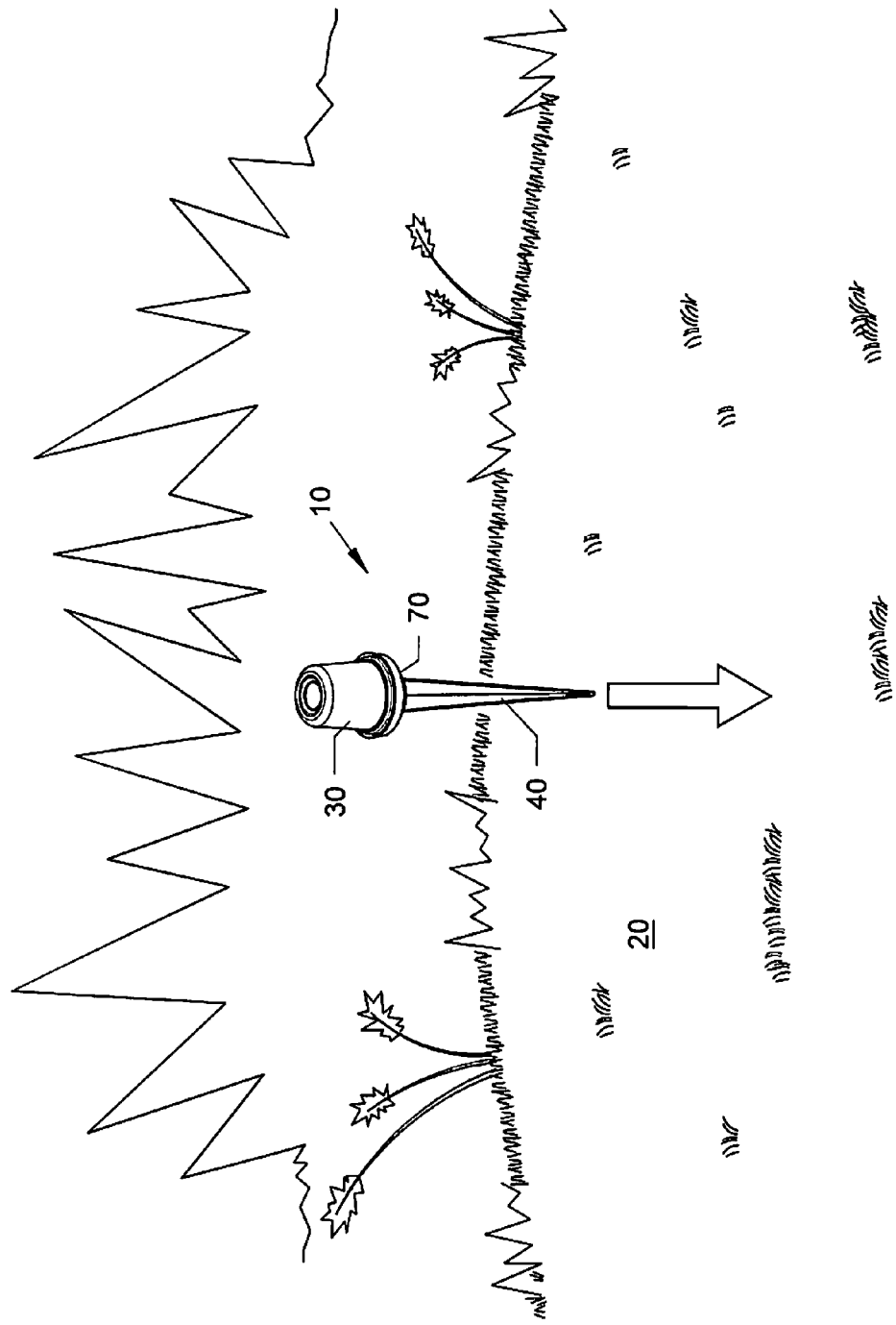
FIG. 9 is a view of a field with the scent holder and yardage marker assembly ready to insert into the turf.

FIG. 9 is a view of a field with the scent holder and yardage marker assembly 10 with the stake 40 ready to be inserted into the turf 20.

Figure 10:
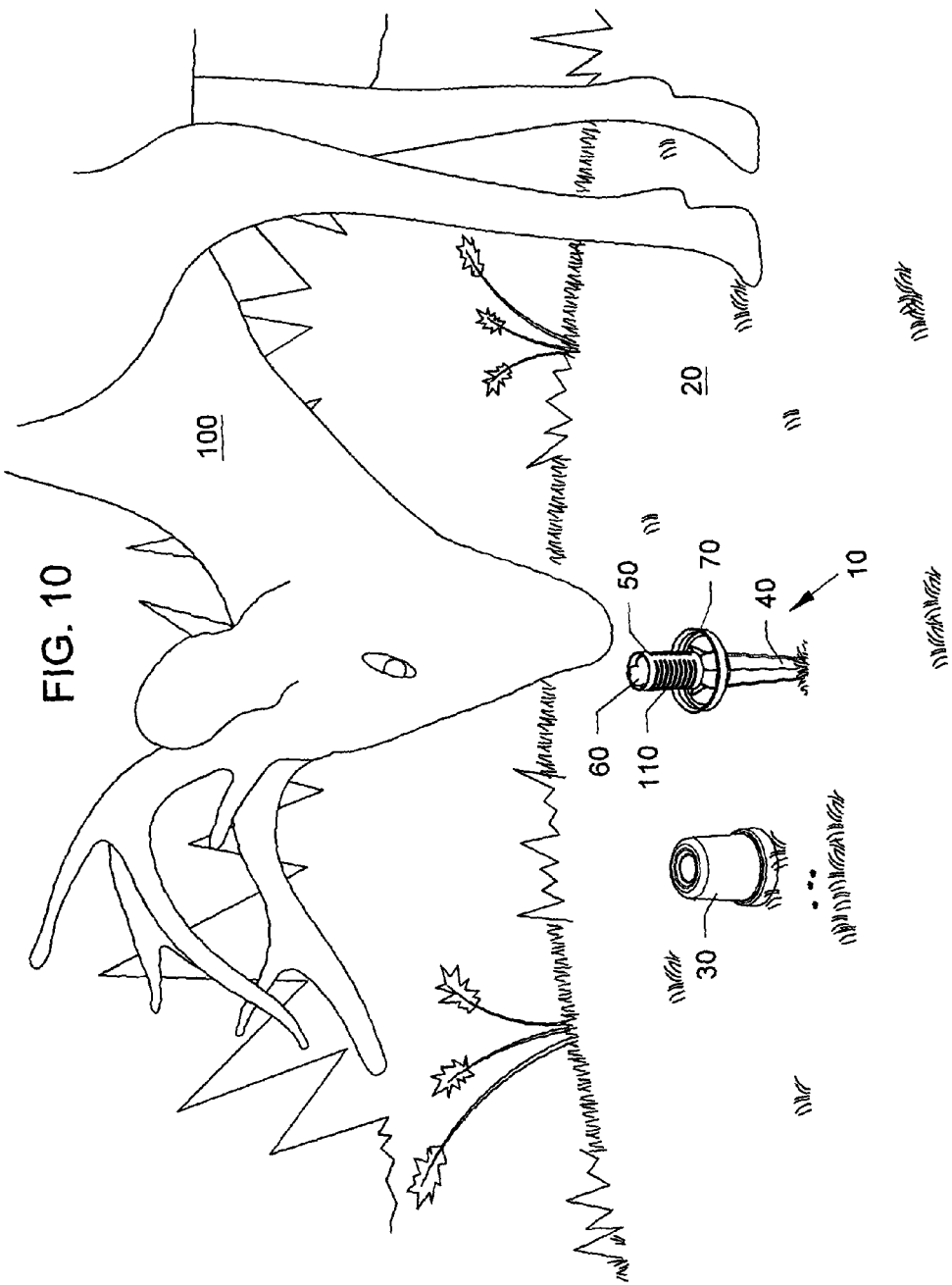
FIG. 10 shows the scent holder and yardage marker assembly inserted into the turf with cover removed exposing the deer attractant to a curious buck.

FIG. 10 shows the scent holder and yardage marker assembly 10 inserted into the turf 20 with the cover 30 removed exposing the deer attractant (which is the liquid deer scent in the absorbing material 60 inside the scent holder 50 having vents 110) which becomes a deer attractant to a curious buck 100.

Figure 11:
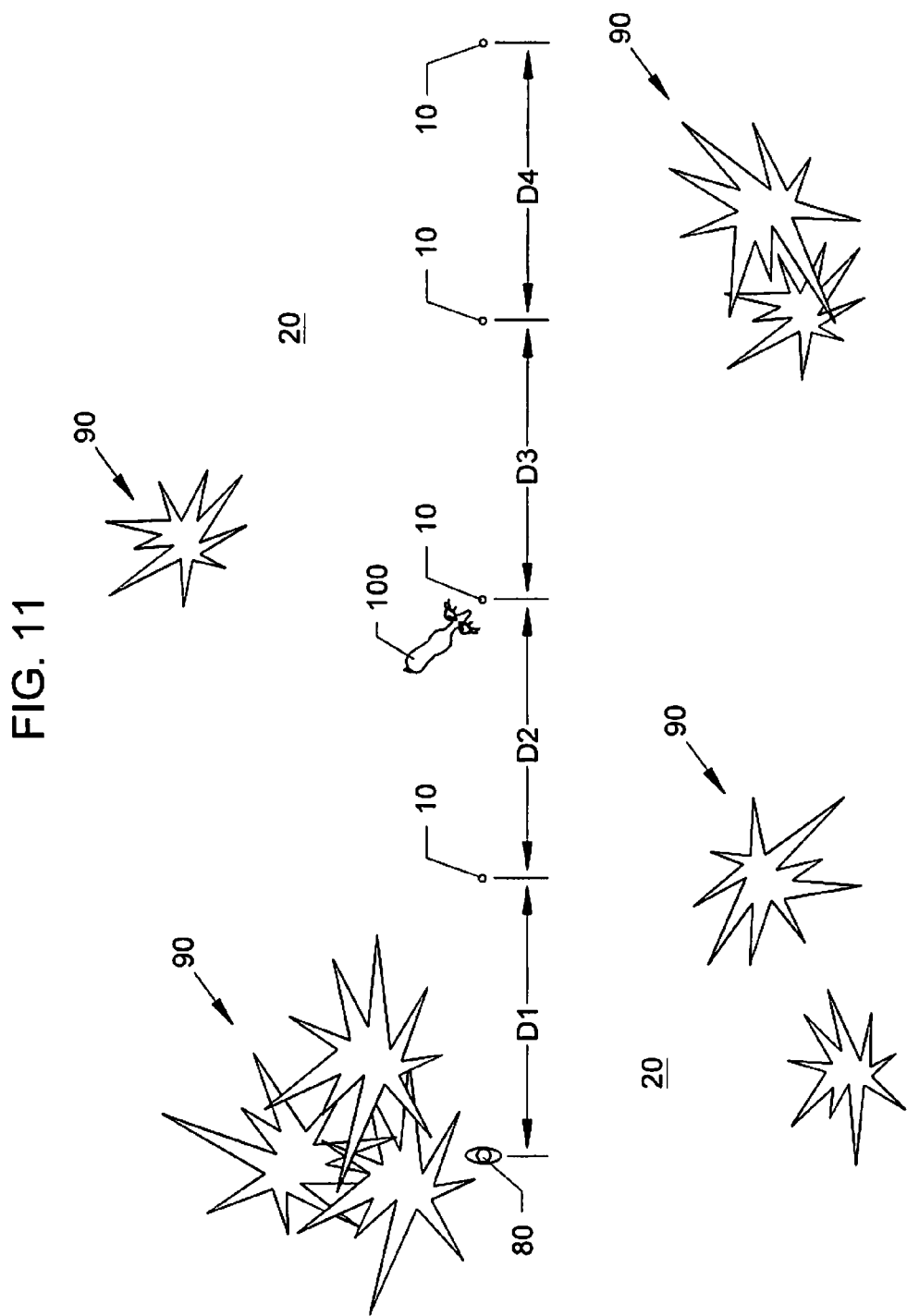
FIG. 11 is a plan view of a typical hunting setup with the scent holder(s) of the preceding figures being used as yardage markers placed at predetermined intervals so that the hunter has an exact of the distance of his target and can make adjustments to his shooting aim accordingly.

FIG. 11 is a plan view of a typical hunting setup with the scent holder(s) and yardage marker assemblies 10 of the preceding figures being used as yardage markers placed at predetermined intervals around natural vegetation 90, that can include trees, shrubs or other cover. The predetermined spacing can be used so that the hunter 80 has an exact predetermined distance to their target deer 100 and can make adjustments to his shooting aim accordingly.

The scent holder(s) and yardage marker assemblies 10 can each be placed at a predetermined distance (D1, D2, D3, D4) to the hunter 80, such each distance being 5 yards, 10 yards, 15 yards, 20 yards, and the like. The scent holder(s) and yardage marker assemblies 10 can also include some type of marking indicia, such a but not limited to various colors, such as but not limited to white, black, red, blue, green, and the like, which each signify a predetermined distance to the location of the hunter. Other types of indicia markings can include but are not limited to placing actual numbers, such as but not limited to yardage numbers on the assemblies 10.

The components can be made from molded plastics, and the like. And the components can have a UV (ultra violet) coating to lengthen their lifespan.

When the assembly 10 is not being used, the hunter can recap the device which will prevent scents, or lures from spilling out. And the hunter can put the assembly into pockets, backpacks, and the like.

Other uses of the novel assembly can be used to put insect repellants, such as but not limited to citronella soaked in the absorbing material for insect prevention, and the assemblies can be place in yards, and gardens to keep pests away.

A preferred embodiment of the device can have a length of approximately 11.08 inches from the top of the cover to the bottom of the stake, with the length of the stake being approximately 7.64 inches, and the cover can have diameter of approximately 2.75 inches.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A deer scent device comprising:
a base with an upwardly protruding cross pattern of raised ribs having an upper end and a lower end, the upper end of raised ribs forming steps which increase in diameter outward toward the lower end of the raised ribs;
a removable cover for covering the base, the base and the removable cover forming a compartment;
a removable scent holder inside of the compartment, the removable scent holder for supporting a deer scent liquid inside, the removable scent holder includes a cylinder having a cylindrically shaped open top and a closed bottom with a cross-shaped opening, the cylinder having a plurality of side vent openings, wherein the cross-shaped opening in the bottom of the cylinder is pushed over the upwardly protruding cross pattern of raised ribs on the base of the compartment allowing for the cylinder to be attached to the base; and
a ground engaging stake extending beneath the base of the compartment for allowing the device to be mounted in the ground.

2. The deer scent device of claim 1, wherein the
a base includes an upwardly protruding outer perimeter edge; and
the removable cover includes a closed top and closed sides, and a lower extending edge, the lower extending edge of the cover being attachable and detachable within the upwardly protruding perimeter edge of the base.

3. The deer scent device of claim 1, wherein the removable scent holder includes:
an absorbing material being removable from the cylinder, the absorbing material capable of soaking up a liquid deer scent.

4. The deer scent device of claim 3, wherein the absorbing material includes:
a ball of cotton.

5. The deer scent device of claim 3, wherein the absorbing material includes:
a sponge material.

6. The deer scent device of claim 1, further comprising:
a marker on a side of the device for indicating a yardage distance target that is adapted to be visible to a hunter using the device.

7. The deer scent device of claim 6, wherein the marker includes:
a color marking on the side of the device adapted to be visible to a hunter.

8. The deer scent device of claim 6, wherein the marker includes:
a number marking on the side of the device adapted to be visible to a hunter.

9. A deer scent dispenser and target aiming system, comprising:
a first base with an upwardly protruding cross pattern of raised ribs having an upper end and a lower end, the upper end of raised ribs forming steps which increase in diameter outward toward the lower end of the raised ribs;
a first removable cover for covering the first base, the first base and the first removable cover forming a first compartment;
a first removable scent holder inside of the first compartment, the first scent holder for supporting a deer scent liquid inside, the first removable scent holder includes a first cylinder having a cylindrically shaped open top and a closed bottom with a cross-shaped opening, the first cylinder having a plurality of side openings, wherein the cross-shaped opening in the bottom of the first cylinder is pushed over the upwardly protruding cross pattern of raised ribs on the first base of the first compartment allowing for the first cylinder to be attached to the first base on the first compartment;

a ground engaging stake extending beneath the base of the first compartment for allowing the first compartment to be mounted in the ground; and a distance indicator marker on the sides side of the first compartment for indicating a yardage distance target that is adapted to be visible to a hunter using the system.

10. The deer scent dispenser and target aiming system of claim 9, further comprising:

a second base with an upwardly protruding cross pattern of raised ribs having an upper end and a lower end, the upper end of raised ribs forming steps which increase in diameter outward toward the lower end of the raised ribs;

a second removable cover for covering the second base, the second base and the second removable cover forming a second compartment;

a second removable scent holder inside of the second compartment, the second removable scent holder for supporting a deer scent liquid inside, the second removable scent holder includes a second cylinder having a cylindrically shaped open top and a closed bottom with a cross-shaped opening, the second cylinder having a plurality of side openings, wherein the cross-shaped opening in the bottom of the second cylinder is pushed over the upwardly protruding cross pattern of raised ribs on the second base of the second compartment allowing for the second cylinder to be attached to the second base on the second compartment;

a second ground engaging stake extending beneath the second base of the second compartment for allowing the second compartment to be mounted in the ground; and a second distance indicator marker on the sides of the second compartment for indicating a yardage distance target that is adapted to be visible to a hunter using the system.

11. The deer scent dispenser and target aiming system of claim 10, wherein the first base and the second base each includes an upwardly protruding outer perimeter edge; and the first removable cover and the second removable cover each include a closed top and closed sides, and a lower extending edge, the lower extending edge of the cover being attachable and detachable within the upwardly protruding perimeter edge of the first base and the second base.

12. The deer scent dispenser and target aiming system of claim 10, wherein the first removable scent holder and the second removable scent holder each includes:

an absorbing material being removable from each of the first cylinder and the second cylinder, the absorbing material capable of soaking up a liquid deer scent.

13. The deer scent dispenser and target aiming system of claim 12, wherein the absorbing material includes: a ball of cotton.

14. The deer scent dispenser and target aiming system of claim 12, wherein the absorbing material includes: a sponge material.

15. The deer scent dispenser and target aiming system of claim 10, wherein the first marker and the second marker each includes:

a color marking on a side of the system adapted to be visible to the hunter.

16. The deer scent dispenser and target aiming system of claim 10, wherein the first marker and the second marker each includes:

a number marking on a side of the system adapted to be visible to the hunter.

* * * * *